(12) United States Patent
Chang et al.

(10) Patent No.: US 8,721,302 B2
(45) Date of Patent: May 13, 2014

(54) FAN ASSEMBLY

(75) Inventors: Shun-Chen Chang, Taoyuan Hsien (TW); Chia-Ming Hsu, Taoyuan Hsien (TW); Chieh-Cheng Liu, Taoyuan Hsien (TW)

(73) Assignee: Delta Electronics, Inc., Taoyuan Hsien (TW)

(*) Notice: Subject to any disclaimer, the term of this patent is extended or adjusted under 35 U.S.C. 154(b) by 372 days.

(21) Appl. No.: 12/908,000

(22) Filed: Oct. 20, 2010

(65) Prior Publication Data
US 2011/0223042 A1 Sep. 15, 2011

(30) Foreign Application Priority Data

Mar. 10, 2010 (TW) .............................. 99106915 A (51) Int. Cl.
*F04D 13/04* (2006.01)
*F04D 25/08* (2006.01)
*F04D 29/32* (2006.01)

(52) U.S. Cl.
USPC ......... 417/336; 417/338; 417/411; 417/423.1

(58) Field of Classification Search
USPC ........ 417/62, 244, 245, 338, 349, 411, 423.1, 417/336; 415/66, 68, 69; 416/120, 123
See application file for complete search history.

(56) References Cited

U.S. PATENT DOCUMENTS

| 2,878,991 | A | 3/1959 | Berman |
| 2002/0090308 | A1* | 7/2002 | Cheng ........................ 417/423.1 |
| 2009/0072541 | A1* | 3/2009 | Van Harselaar ................ 290/54 |

FOREIGN PATENT DOCUMENTS

| CN | 101099041 A | 1/2008 |
| CN | 201281029 Y | 7/2009 |
| DE | 706213 C | 5/1941 |

* cited by examiner

*Primary Examiner* — Bryan Lettman
(74) *Attorney, Agent, or Firm* — CKC & Partners Co., Ltd.

(57) ABSTRACT

A fan assembly includes an active fan, a supporting base and a passive element. The active fan includes a first impeller and a motor. The passive element is driven to rotate by an airflow from the active fan. The passive element includes a impeller and at least one load. The load is connected to the impeller.

6 Claims, 10 Drawing Sheets

FAN ASSEMBLY

RELATED APPLICATIONS

This application claims priority to Taiwan Application Serial Number 99106915, filed Mar. 10, 2010 which is herein incorporated by reference.

BACKGROUND

1. Technical Field

The present invention relates to a wind energy conversion device. More particularly, the present invention relates to a fan assembly with function of dynamic pressurizing, flow guiding and wind-energy recycling.

2. Description of Related Art

Fans are widely used nowadays. For example, they are used in heat-dissipation devices, hair dryers, indoor air exhausting devices and wind generators in the wind tunnel laboratory. These different examples of fans may have similar or different structures.

Figure 1:
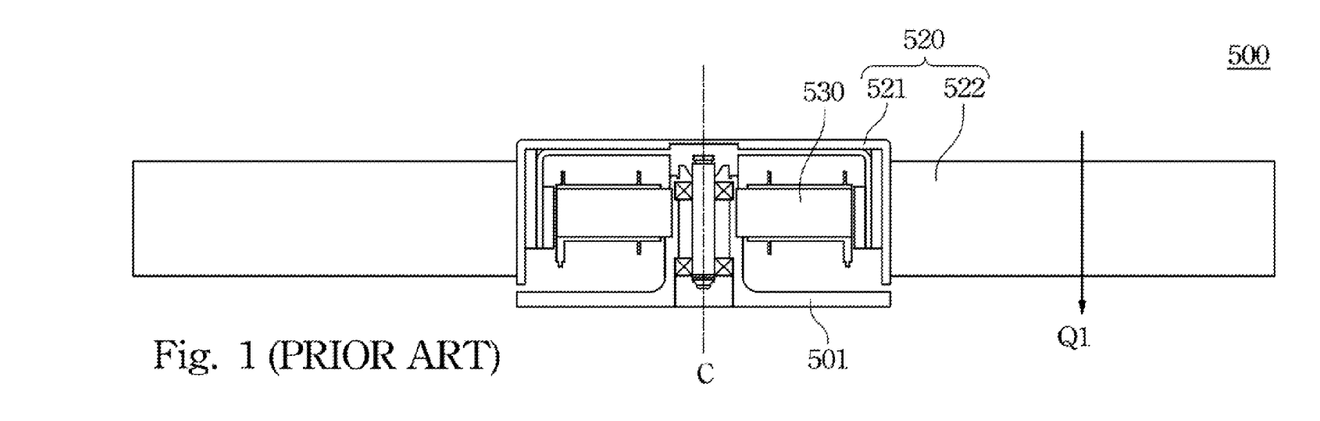
FIG. 1 is a schematic diagram of a known fan assembly.

FIG. 1 is a schematic diagram of a known fan. The fan 500 used for dissipating heat in conventional computer rooms includes a rotor 520 and a stator 530. The rotor 520 having a hub 521 and several blades 522, is disposed on a base 501 and is coupled to the stator 530. When the rotor 520 is driven along a central axis C, the airflow Q1 is generated by the rotation of the blades 522, thereby controlling the temperature of the computer room.

However, when the demand for the airflow volume increases, the blades 522 with greater radial length are required. For example, the length of the blades 522 needs 18-40 cm. As the length of the blades 522 becomes longer, the weight and the torsion of the rotor 520 will be greatly increased. Therefore, a motor with higher power and larger size is needed.

With the increased weight of the internal components of the fan 500 having higher power and larger size, the efficiency of the fan 500 is lowered and a higher driving current is required. In order to maintain the same airflow volume, the overall size of the fan is increased, and the airflow intake will be reduced accordingly. The fan 500 will occupy more space and the overall power consumption is greatly increased.

SUMMARY

In order to solve the above-mentioned problems, a fan assembly is disclosed according to one object of the invention. The fan assembly is capable of maintaining the original flow amount and torsion and even providing an extra amount of airflow, without increasing the size and the power of the motor.

According to another object of the invention, a fan assembly including a motor with lower power and smaller size is disclosed. The power consumption of the motor is lowered, the efficiency of the motor is increased, and the overall volume of the fan assembly is reduced. Accordingly, the region of the fan assembly that the airflow cannot pass through is reduced, and the dead space can be reduced.

According to the present invention, the fan assembly includes an active fan, a supporting base and a passive element. The active fan includes a first impeller and a motor. The passive element is driven to rotate by an airflow from the active fan. The passive element includes a second impeller and at least one first load connected to the second impeller. Due to the reason that the passive element is driven by the airflow from the active fan, the requirements of low rotation speed and high efficiency of the motor are meet. In comparison with conventional fan devices, the fan assembly of the present invention maintains the original airflow volume and torsion and even provides extra flow amount without increasing the size and the power of the motor.

On the other hand, in the fan assembly of the present invention, the motor only needs to drive the active fan to provide the airflow, so the passive element can be subsequently driven by the airflow. Therefore, a motor with lower power and smaller size can be utilized in the fan assembly, not only lowering the power consumption but also reducing the overall volume of the fan assembly. The region of the fan assembly that the airflow cannot pass through is reduced, and the dead space is reduced accordingly. Moreover, the manufacturing cost is saved and the competitiveness of the product is enhanced.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to this embodiments of the invention, examples of which are illustrated in the accompanying drawings. Wherever possible, the same reference numbers are used in the drawings and the description to refer to the same or like parts.

Figure 2:
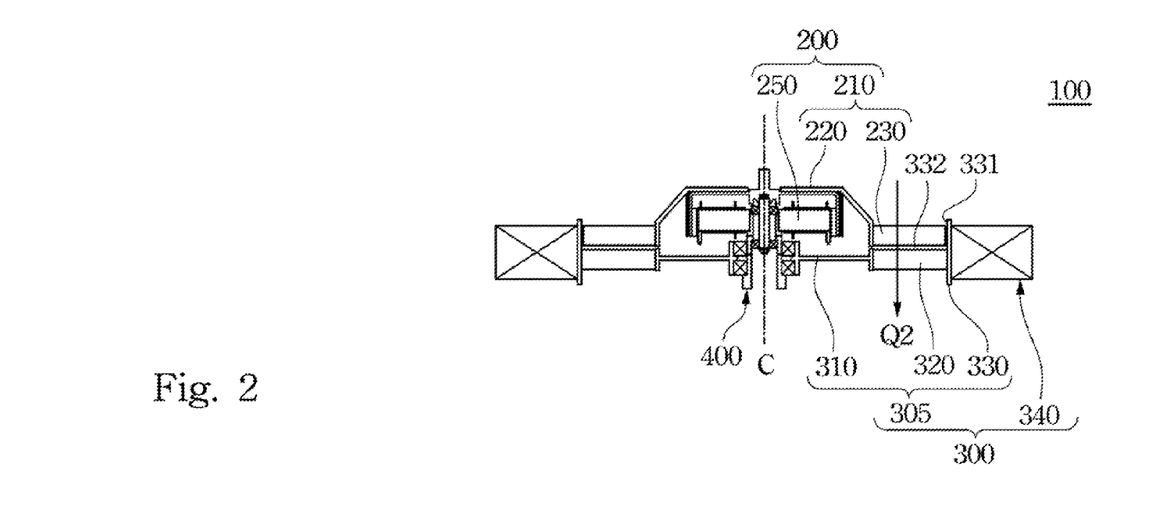
FIG. 2 is a schematic diagram of a fan assembly according to the first embodiment of the invention.

FIG. 2 is a schematic diagram of a fan assembly according to the first embodiment of the invention. A fan assembly 100 including at least one active fan 200, a supporting base 400 and a passive element 300 is disclosed. The active fan 200 is coupled to the passive element 300 and provides an airflow to drive the passive element 300. The active fan 200 includes a motor 250 and a first impeller 210. The first impeller 210 includes a first hub 220 and a plurality of first blades 230. The first blades 230 are disposed around the first hub 220. The first impeller 210 is driven by the motor 250 with respect to a central axis C.

The passive element 300 includes a second impeller 305 and at least one load 340. The second impeller 305 faces the first impeller 210 and includes a second hub 310, a plurality of second blades 320 and a first annular guiding structure 330. The second hub 310 is disposed on the supporting base 400. The second blades 320 are disposed around the second hub 310. The first annular guiding structure 330 is disposed at the distal ends of the second blades 320, and thus the second hub 310 is surrounded by the first annular guiding structure 330. The first load 340 is connected to the second impeller 305. More specifically, the first load 340 is fixed to the first annular guiding structure 330 so as to revolve simultaneously with the second blades 320.

As a result, when the first impeller 210 is driven to rotate by the motor 250, the airflow Q2 generated by the first impeller 210 will drive the second blades 320 to rotate with respect to the central axis C. Thus, the first load 340 can simultaneously rotate with the second impeller 305.

As shown in FIG. 2, the inner wall 331 of the first annular guiding structure 330 of this embodiment confines an accommodating space 332. The accommodating space 332 accommodates the second hub 310 and the second blades 320 disposed around the second hub 310. Further, at least one part of the first blade 230 or the entire first impeller 210 can also extend into the accommodating space 332. When the first impeller 210 rotates, the inner wall 331 of the first annular guiding structure 330 guides the airflow Q2 generated by the first blades 230 toward the second blades 320, thereby driving the second impeller 305 to rotate. The rotation efficiency of the second blade 320 increases accordingly.

On the other hand, the inner wall 331 of the first annular guiding structure 330 is in parallel with (as shown in figures) or not in parallel with the central axis C (not shown in the figures). For example, the slope of the inner wall 331 of the first annular guiding structure 330 gradually increases along the direction toward the first impeller 210 so as to expand the accommodating space 332. As a result, the first impeller 210 of a larger size is able to fit into the accommodating space 332, and the airflow Q2 for driving the second impeller 305 can be increased accordingly.

Figure 3A:
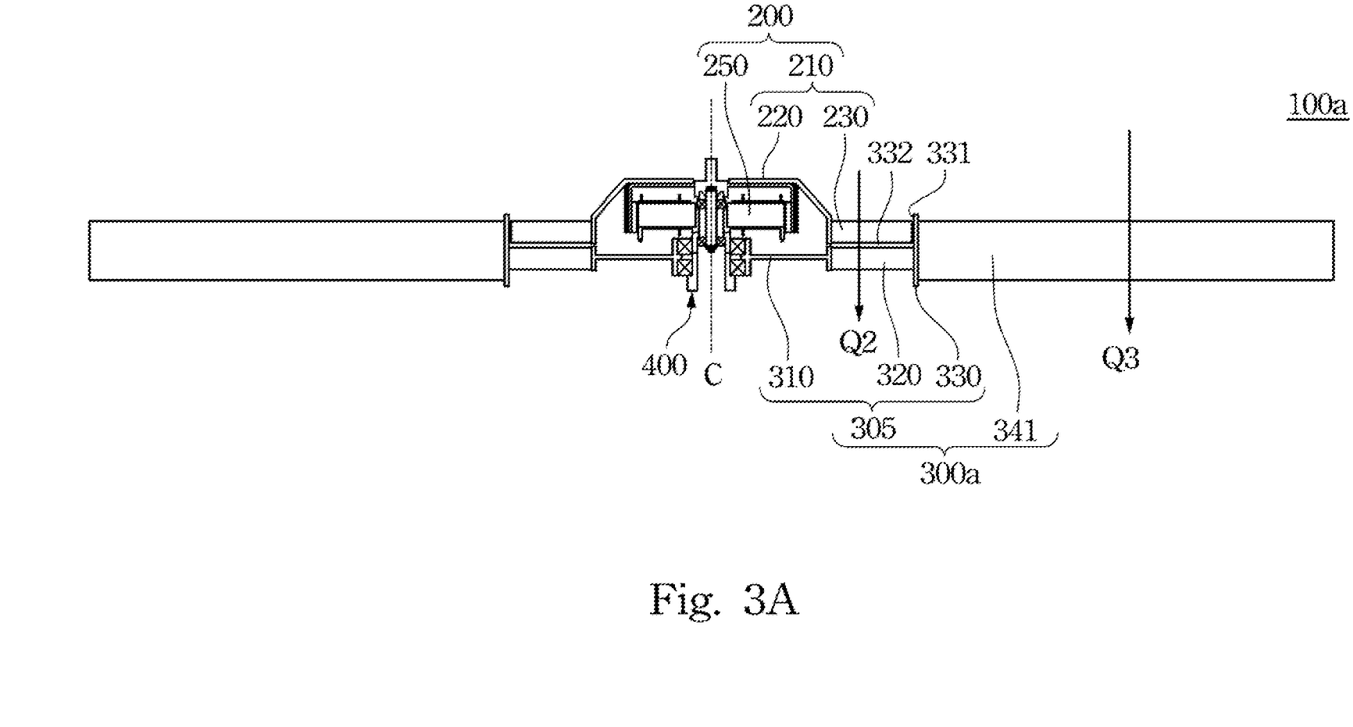
FIG. 3A is a schematic diagram of a fan assembly according to the second embodiment of the invention.
Figure 3B:
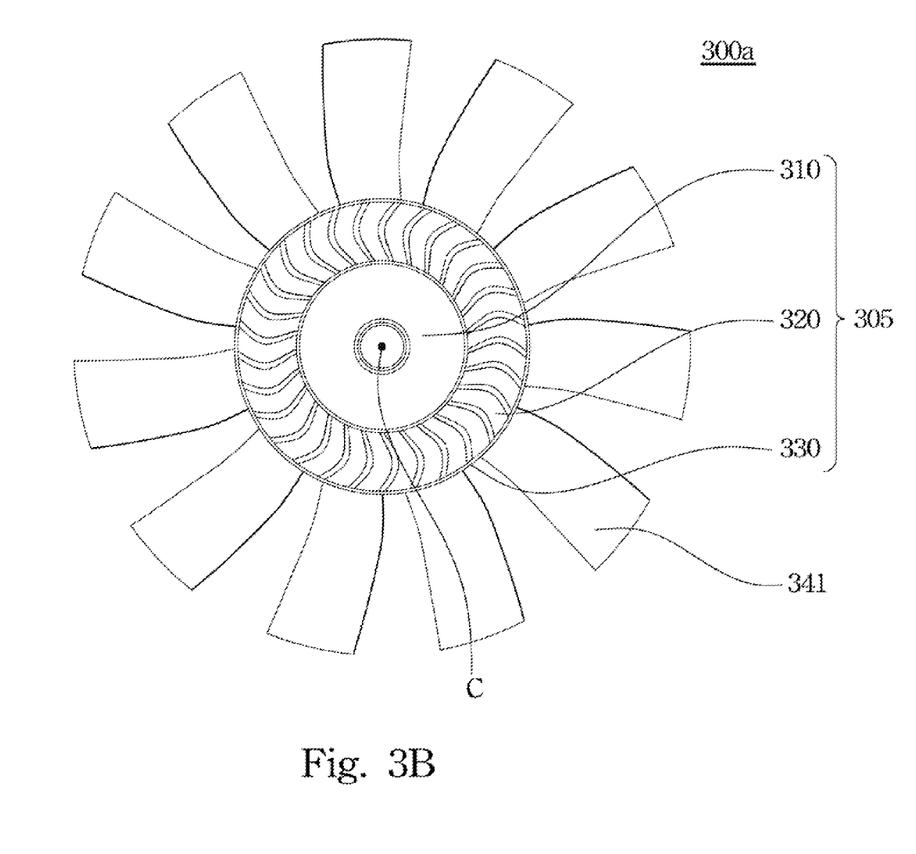
FIG. 3B is a top view of the passive element of FIG. 3A.

FIG. 3A is a schematic diagram of a fan assembly according to the second embodiment of the invention. FIG. 3B is a top view of the passive element 300a in FIG. 3A. The fan assembly 100a of this embodiment differs from the fan assembly 100 of the first embodiment in that the first load 340 (shown in FIG. 2) of the first embodiment is replaced by a plurality of third blades 341 In the second embodiment. The third blades 341 are equidistantly disposed at the external edge of the first annular guiding structure 330. Therefore, when the first impeller 210 rotates, the second impeller 305 and the third blades 341 rotate with respect to the central axis C simultaneously.

In a case when the diameter of the passive element 300a (about 18-40 cm) is close to that of the fan device 500 of the prior art (as shown in FIG. 1), the second embodiment further provides an extra airflow Q3 in addition to the airflow Q2 generated by the first impeller 210. The airflow Q3 is generated by the third blades 341 simultaneously rotating with the second impeller 305.

In this embodiment, the diameter of the first impeller 210 is smaller than that of the passive element 300a (for example 18-40 cm), and the motor 250 simply needs to drive the second impeller 305. Thus, the motor 250 for driving the second impeller 305 is smaller than that for driving the impeller of the fan 500 (having a diameter of 18-40 cm) as shown in FIG. 1. As a result, a lower power motor, i.e. a smaller size motor, can be used in the fan assembly 100a of the present invention. The power consumption of the motor is reduced, the efficiency of the motor is improved, and the overall volume of the fan assembly is decreased. Further, the region of the fan assembly that the airflow cannot pass through is reduced, thereby reducing the dead space. The fan assembly 100a of this embodiment at least maintains the original flow amount and rotation torsion, and even provides extra airflow volume (Q2+Q3).

Figure 4:
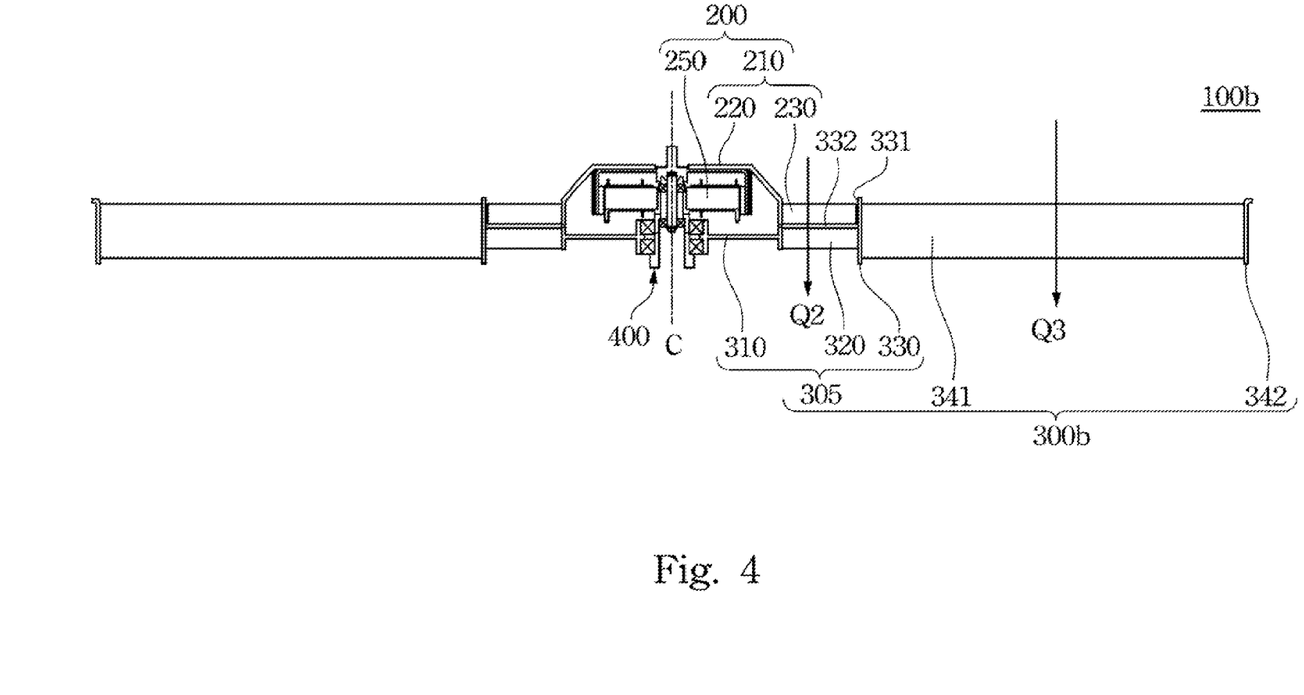
FIG. 4 is a schematic diagram of a fan assembly according to the third embodiment of the invention.

FIG. 4 is a schematic diagram of a fan assembly according to the third embodiment of the invention. The fan assembly 100b of the third embodiment differs from the fan assembly 100a of the second embodiment in that the passive element 300b further includes a second annular guiding structure 342. The second annular guiding structure 342 is disposed at the distal ends of the third blades 341, and thus the third blades 341 are surrounded by the second annular guiding structure 342. By using the second annular guiding structure 342 in this embodiment, the direction uniformity of the airflow Q3 is increased.

Practically, the number of the second blades 320 can be identical to that of the third blades 341. The second blades 320 and the third blades 341 can also be different in numbers so as to provide better operative effects. The numbers and the lengths of the second blades 320 and the third blades 341 can be adjustable in accordance with practical requirements. For example, the radial length of each third blade 341 can be 9, 15, or even 40 cm.

Figure 5:
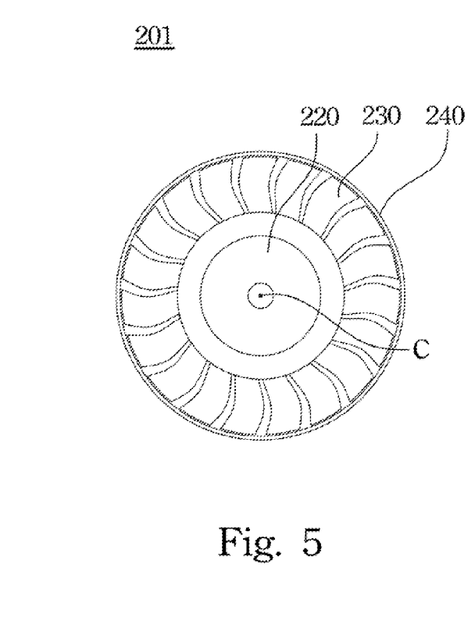
FIG. 5 is a top view of an active fan according to the fourth embodiment of the invention.

Please refer to FIG. 3A and FIG. 5. FIG. 5 is a top view of an active fan according to the fourth embodiment of the invention. Whether the first blades 230 (as shown in FIG. 3A) extend into the accommodating space 233 or not, the active fan 201 of the fourth embodiment (as shown in FIG. 5) can further include a third annular guiding structure 240. The third annular guiding structure 240 is connected to the distal ends of the first blades 230, and thus the first blades 230 are surrounded by the second annular guiding structure 240. When the active fan 201 rotates, the airflow Q2 (as shown in FIG. 3A) generated by the first blades 230 can be gathered and guided to the accommodating space 332 by the inner wall of the third annular guiding structure 240 so as to concentrate the airflow Q2 generated by the second impeller 305.

Figure 6:
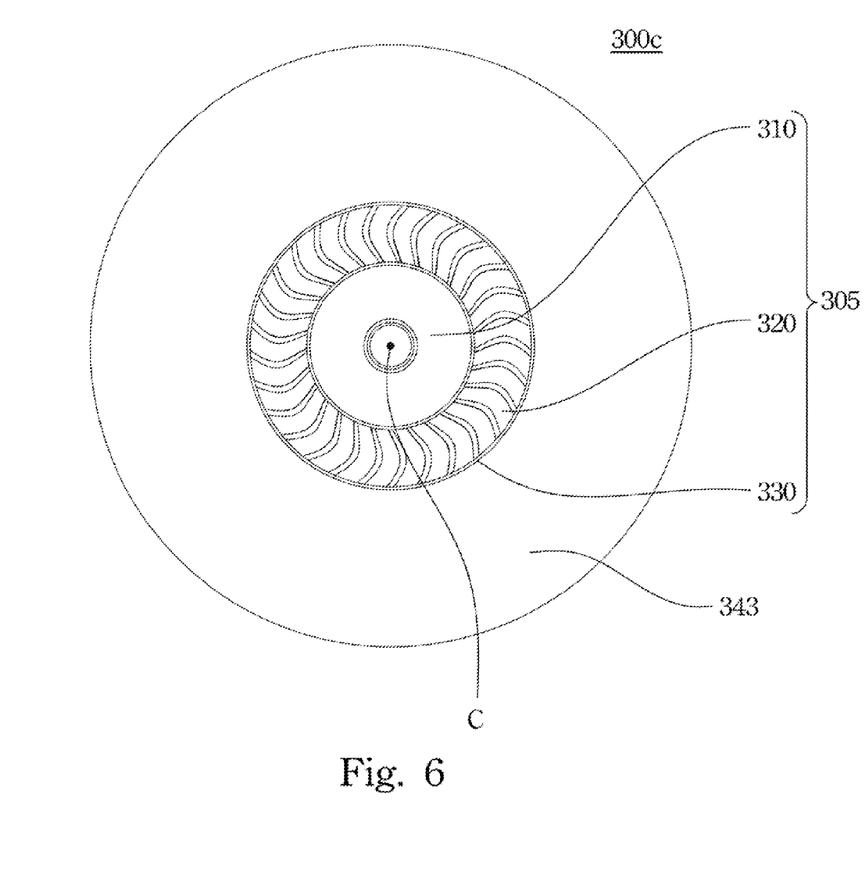
FIG. 6 is a top view of a passive element according to the fifth embodiment of the invention.

FIG. 6 is a top view of a passive element according to the fifth embodiment of the invention. The fan assembly 100b of the fifth embodiment differs from the fan assembly 100 of the first embodiment in that the first load 340 of the first embodiment (as shown in FIG. 2) is replaced by a plate 343. The plate 343 is exemplified by a circular ring connected to the external edge of the first annular guiding structure 330. When the first impeller 210 in FIG. 2 rotates, the second impeller 305 of the passive element 300c in FIG. 6 and the plate 343 rotate simultaneously. For example, the plate 343 can be used for conveying objects.

Figure 7:
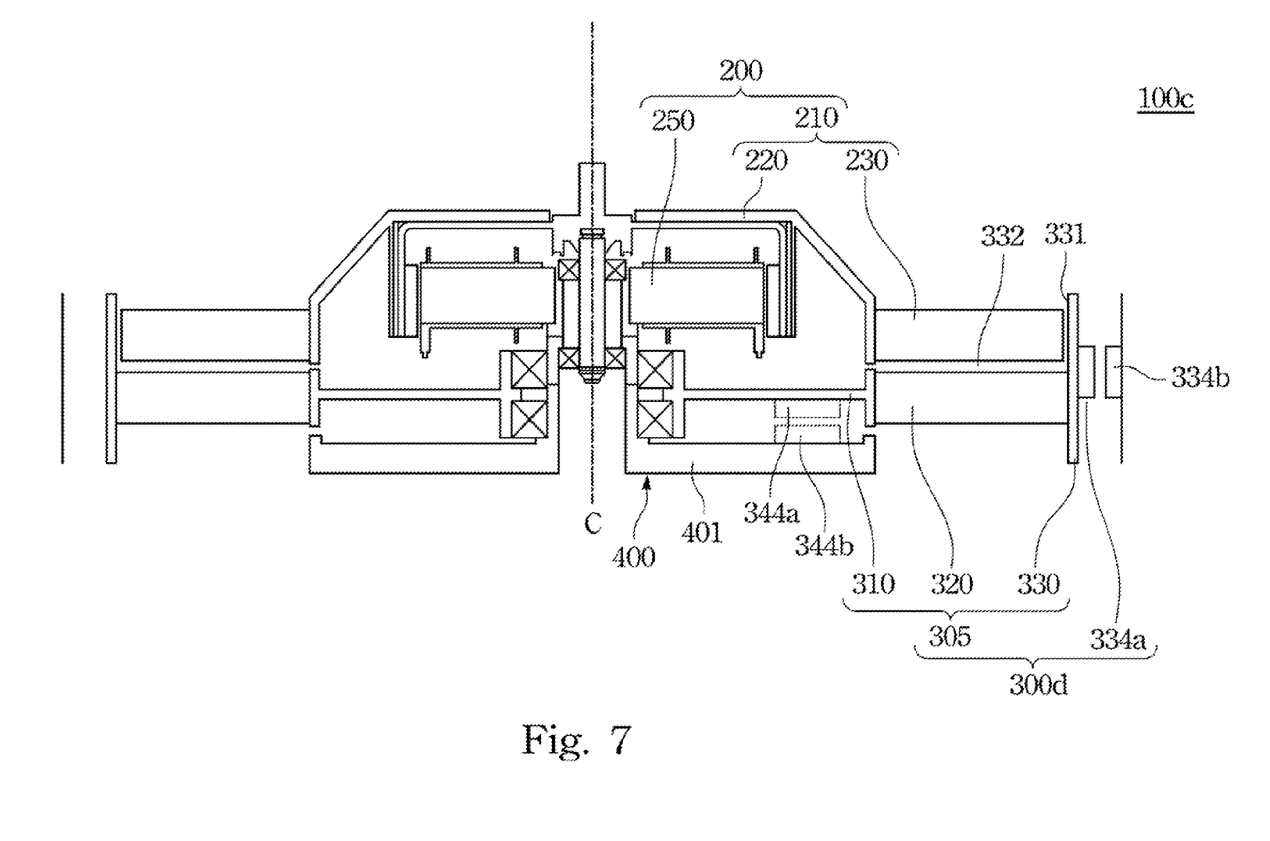
FIG. 7 is a schematic diagram of a fan assembly according to the sixth embodiment of the invention.

FIG. 7 is a schematic diagram of a fan assembly 100c according to the sixth embodiment of the invention. The sixth embodiment differs from the first embodiment in that the load 340 of the first embodiment is replaced by one or more first electromagnetic components 334a, such as magnets. The first electromagnetic component 334a is disposed at the external edge of the first annular guiding structure 330. A second electromagnetic component 334b (such as a coil) is disposed at a static element near the first electromagnetic component 334a. When the first impeller 210 of the fan assembly 100c rotates, the second impeller 305 of the passive element 300d and the first electromagnetic component 334a rotate simultaneously. The rotating first electromagnetic component 334a interacts with the static second electromagnetic component 334b so as to serve as a power generator.

On the other hand, when an active electromagnetic interaction takes place between the first electromagnetic component 334a and the second electromagnetic component 334b, the first electromagnetic component 334a also facilitates the rotation of the passive element 300d.

However, in addition to the above-described locations, the first electromagnetic component 334a and the second electromagnetic component 334b can also be disposed at other locations of the passive element 300d. For example, another electromagnetic component 344a (the portion of the dashed lines in FIG. 7) is disposed on the second hub 310, and another electromagnetic component 344b corresponding to the electromagnetic component 344a (the portion of the dashed lines in FIG. 7) is disposed at a protruded portion 401 of the supporting base 400. The fan assembly 100c can also include the first electromagnetic components 334a and 344a and the second electromagnetic components 334b and 344b at the same time, depending on practical needs.

Figure 8:
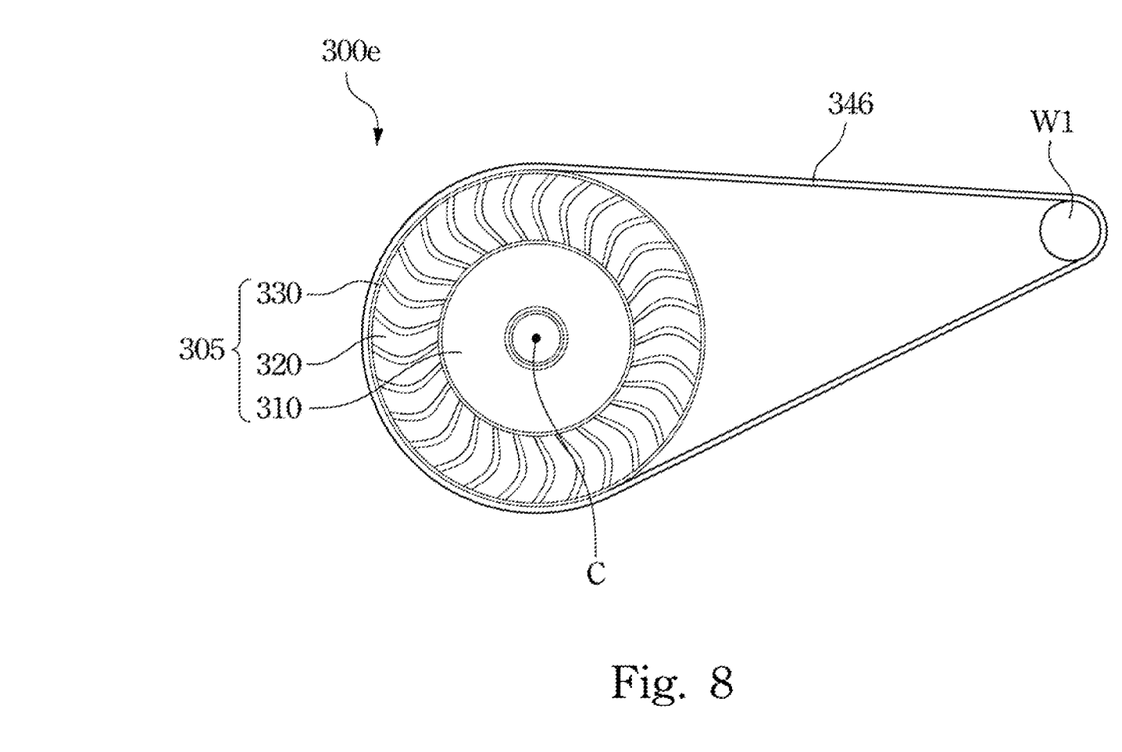
FIG. 8 is a top view of a passive element and a rotatable element according to the seventh embodiment of the invention.

FIG. 8 is a top view of a passive element 300e and a rotatable element W1 according to the seventh embodiment of the invention. The active fan is omitted in this figure to clearly show the relation between the passive element 300e and the rotatable element W1.

The seventh embodiment differs from the first embodiment in that the first load 340 of the first embodiment (as shown in FIG. 2) is replaced by one or more belts 346 (such as transmission belts) in the seventh embodiment. The belt 346 surrounds the external edge of the rotatable element W1 and the external edge of the first annular guiding structure 330 at the same time. In this manner, the belt 346 is driven by the second impeller 305 of the passive element 300e as the first impeller 210 (as shown in FIG. 2) rotates, and the rotatable element W1 is driven by the belt 346 accordingly.

Figure 9:
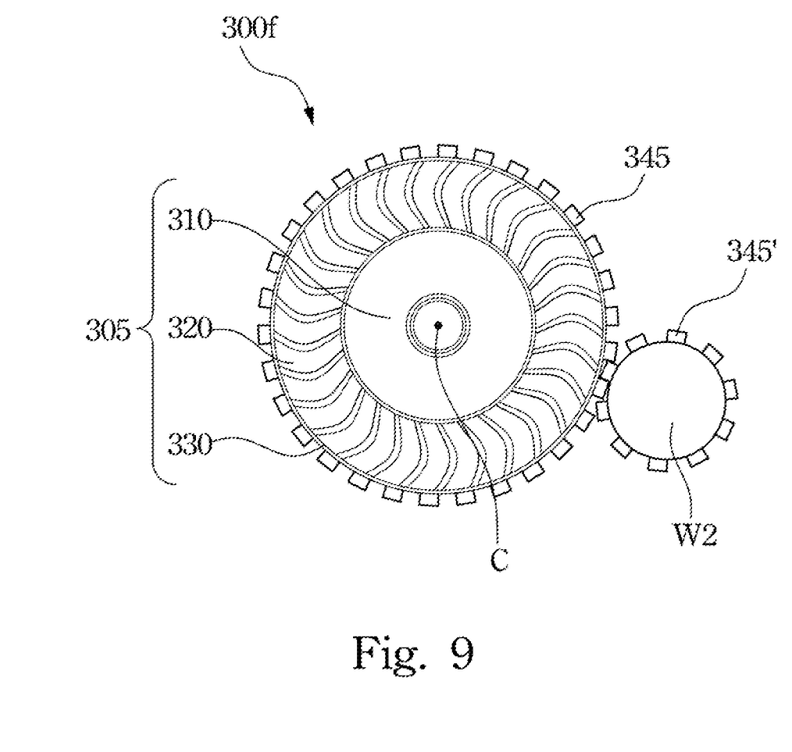
FIG. 9 is a top view of a passive element and another rotatable element according to the eighth embodiment of the invention.

FIG. 9 is a top view of a passive element 300f and another rotatable element W2 according to the eighth embodiment of the invention. The active fan in this figure is omitted for the clarity of the relation between the passive element 300f and the rotatable element W2.

The eighth embodiment differs from the first embodiment in that the first load 340 (as shown in FIG. 2) of the first embodiment is replaced by a gear set 345 in the eighth embodiment. The gear set 345 includes several gear teeth equidistantly disposed at the external edge of the first annular guiding structure 330, and the first annular guiding structure 330 is surrounded by the gear teeth. Meanwhile, the gear set 345 is engaged with another gear set 345' on the rotatable element W2. In this manner, when the first impeller 210 (as shown in FIG. 2) rotates, the second impeller 305 of the passive element 300f drives the gear set 345 to rotate about the central axis C. By the engagement of the two gear sets 345 and 345', the rotation of the rotatable element W2 is achieved.

Figure 10:
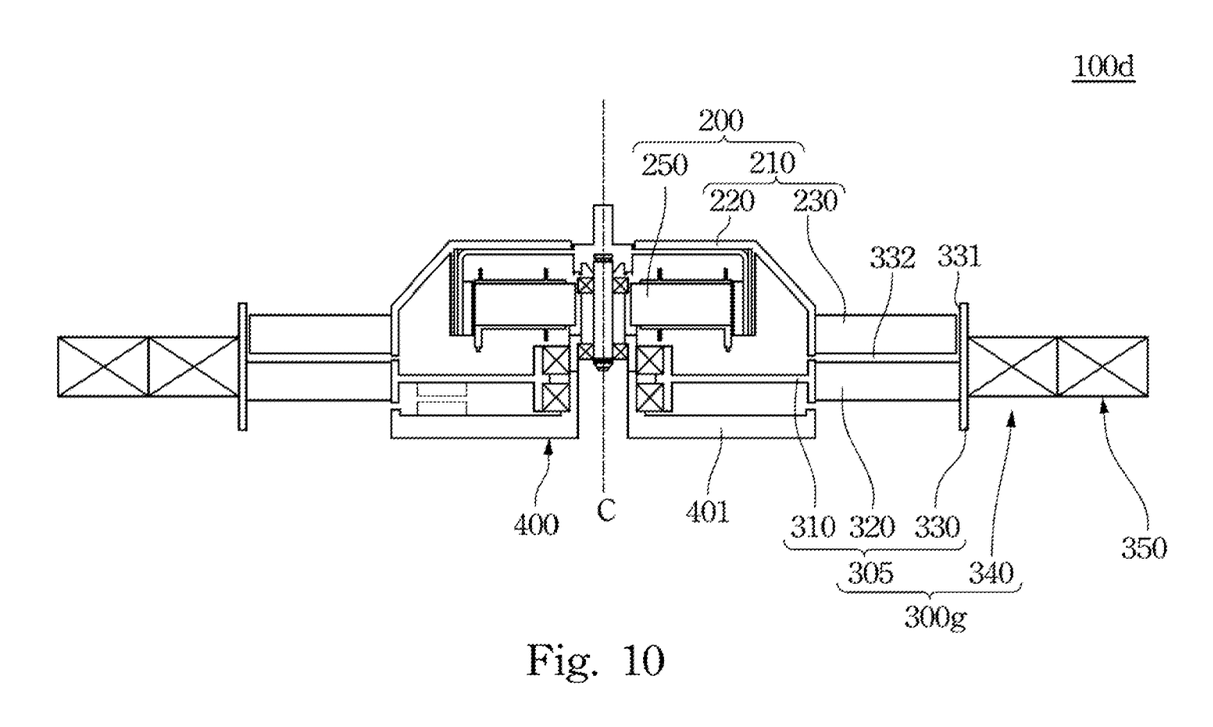
FIG. 10 is a schematic diagram of a fan assembly according to the ninth embodiment of the invention.

FIG. 10 is a schematic diagram of a fan assembly according to the ninth embodiment of the invention. In addition to the first load 340 of the first embodiment, the fan assembly 100d further includes a second load 350 connected to the external edge of the first load 340. is The first load 340 of the ninth embodiment can be exemplified by the blades, the plate, the electromagnetic component, the gear set or the belt described in the above eight embodiments. The second load 350 of the ninth embodiment can be exemplified by the blades, the plate, the electromagnetic component, the gear set or the belt described in the above eight embodiments. Other reasonable variations of the second load 350 can be utilized in the invention so as to provide more practical applications on simultaneous rotating and to enhance the effect of the invention.

For instance, the first load 340 of the ninth embodiment is exemplified by several blades. As the blades are provided with the second annular guiding structure 342 of the third embodiment (as shown in FIG. 4), the second load 350 can also be exemplified by several blades. The blades of the second load 350 are equidistantly disposed at the external edge of the second annular guiding structure 342. Therefore, when the first impeller 210 (as shown in FIG. 4) rotates, the second impeller 305 of the passive element 300g simultaneously drives the first load 340 and the second load 350 to rotate about the central axis C so as to provide additional airflows.

The numbers and the radial lengths of the second blades 320, the first load 340 and the second load 350 can be altered according to actual needs.

In another example, the first load 340 of the ninth embodiment is exemplified by several blades. As the blades are provided with the second annular guiding structure 342 of the third embodiment (as shown in FIG. 4), the second load 350 can be one or more electromagnetic components (such as magnets). The electromagnetic components are disposed at the external edge of the second annular guiding structure 342.

Further, another electromagnetic component (such as a coil) is disposed on a static element near the second load 350. When the first impeller 210 (as shown in FIG. 4) rotates, the electromagnetic components of the second load 350 interact with the static electromagnetic component.

Figure 11:
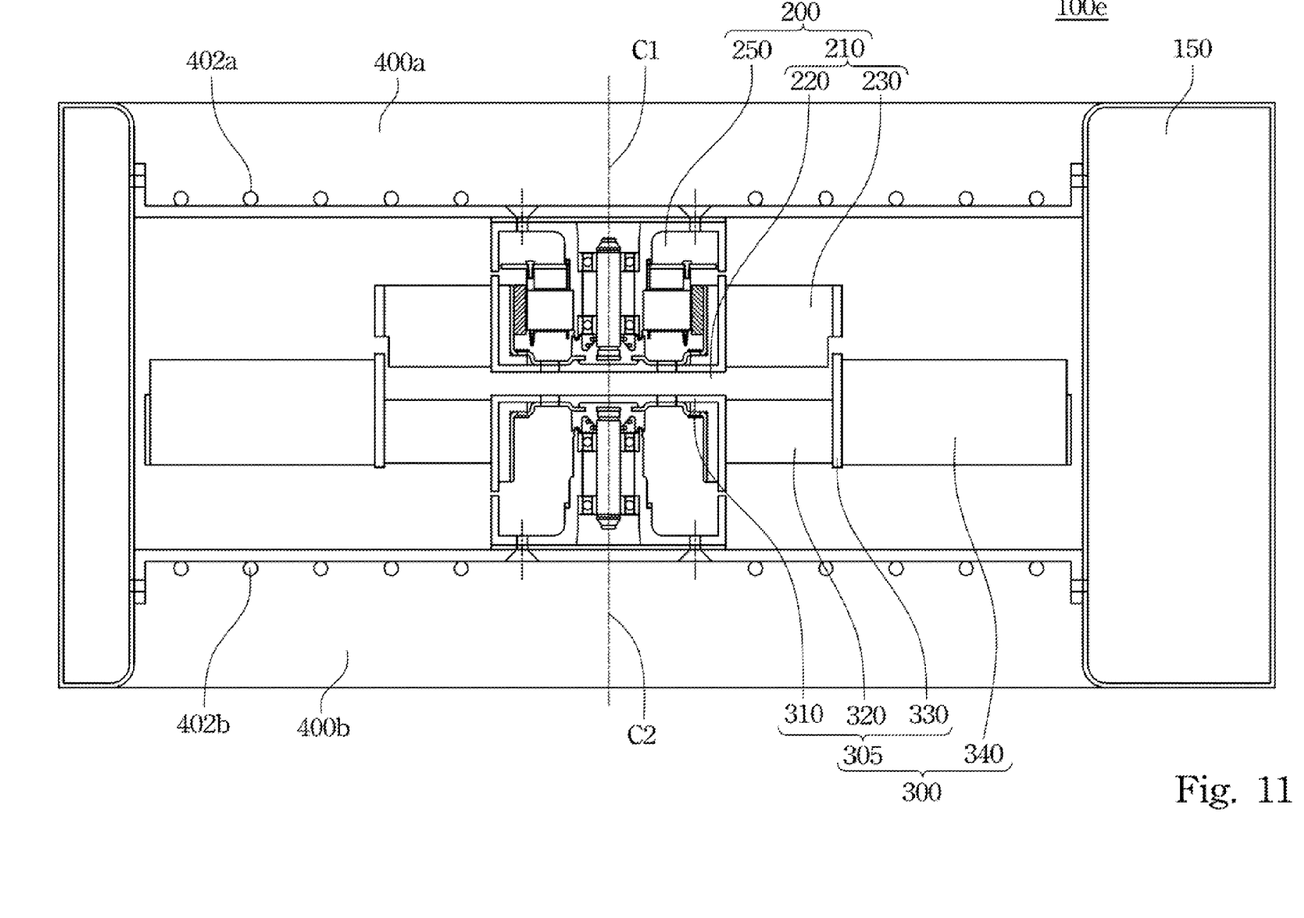
FIG. 11 is a schematic diagram of a fan assembly according to the tenth embodiment of the invention.

FIG. 11 is a schematic of a fan assembly according to the tenth embodiment of the invention. The fan assembly 100e of the tenth embodiment differs from the fan assembly 100 of the first embodiment in that the active fan 200 and the passive element 300 are disposed on two separate bases (400a, 400b) opposite to each other. In particular, the active fan 200 is secured to the base 400a while the passive element 300 is secured to the base 400b. The bases (400a, 400b) are disposed on two opposite sides of a fan frame 150. Each of the bases (400a, 400b) includes a plurality of ribs (402a, 402b) to form air vents and prevent users' hands or fingers from touching the blades within the fan frame 150. Besides, a central axis C1 of the active fan 200 is coaxial with a central axis C2 of the passive element 300.

The following details of the invention should be noticed.

1. The rotation speed of the first impeller driven by the motor is greater than that of the second impeller (i.e. the rotation speed of the passive element). For example, the ratio of the rotation speed of the first impeller to the rotation speed of the second impeller is about 3:1, so the airflow generated by the first impeller is powerful enough to drive the passive element. However, the rotation speed of the first impeller driven by the motor and the rotation speed of the second impeller can be altered according to practical needs.

2. The active fan and the passive element of the fan assembly of the invention do not necessarily share the same central axis. They can respectively revolve about different central axes. In other words, the first impeller and the passive element may share the same central axis C (as shown in FIG. 2), or alternatively revolve around different central axes according to practical needs, as long as the first impeller provides the airflow to drive the second impeller.

3. The radial length of each first blade is substantially the same as or different from the radial length of each second blade. The radial lengths of each first blade and each second blade can be adjusted according to practical needs.

4. The active fan and the passive element can be disposed on the same supporting base (as shown in FIG. 2) or on different supporting bases, depending on practical requirements.

5. The internal components of the passive element, such as the second hub, the second blades, the first annular guiding structure, and the first load, are formed as a monolithic, or these internal components are separate parts to be assembled together.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A fan assembly comprising:
   an active fan having a first impeller and a motor;
   a supporting base; and
   a passive element, comprising:
   a second impeller driven to rotate by an airflow discharged from the active fan; and
   at least one first load connected to the second impeller, wherein the first load is isolated from the airflow discharged from the active fan, and the first load rotates along with the second impeller;
   wherein the second impeller comprises:
   a second hub disposed on the supporting base; and
   a plurality of second blades disposed around the second hub, wherein the first load is attached directly to second blades.

2. The fan assembly of claim 1, wherein the first impeller comprises a first hub and a plurality of first blades disposed around the first hub, and the second impeller faces the first impeller and comprises:
   the second hub disposed on the supporting base;
   the plurality of second blades disposed around the second hub; and
   at least one first annular guiding structure disposed at the distal ends of the second blades.

3. The fan assembly of claim 2, wherein an inner wall of the first annular guiding structure confines an accommodating space and at least a part of the first blades extends into the accommodating space.

4. The fan assembly of claim 2, wherein an inner wall of the first annular guiding structure is parallel to or inclined with respect to a central axis of the active fan.

5. A fan assembly comprising:
   an active fan having a first impeller and a motor, wherein the first impeller has a central axis and a radial direction orthogonal to the central axis;
   a supporting base; and
   a passive element, comprising:
   a second impeller driven to rotate by an airflow discharged from the active fan, wherein the first impeller and the second impeller are arranged along the central axis: and
   at least one first load connected to the second impeller, wherein the first load is isolated from the airflow discharged from the active fan, and the first load rotates along with the second impeller, wherein a distance defined along the radial direction between the first load and the central axis is greater than a radius of the first impeller.

6. A fan assembly comprising:
   an active fan having a first impeller and a motor;
   a supporting base; and
   a passive element, comprising:
   a second impeller driven to rotate by an airflow discharged from the active fan; and
   at least one first load connected to the second impeller, wherein the first load is isolated from the airflow discharged from the active fan, and the first load rotates along with the second impeller;
   wherein the second impeller comprises:
   a second hub disposed on the supporting base;
   a plurality of second blades disposed around the second hub; and
   at least one first annular guiding structure attached directly to the distal ends of the second blades;
   wherein the first load is attached directly to the first annular guiding structure of the second impeller.

* * * * *